United States Patent
Schweizer et al.

(10) Patent No.: US 6,257,811 B1
(45) Date of Patent: Jul. 10, 2001

(54) MACHINE TOOL WITH A WORKING AREA EXTENDING OUTSIDE A WORKPIECE TABLE

(75) Inventors: Anton Schweizer, Wurmlingen; Hans-Henning Winkler, Tuttlingen, both of (DE)

(73) Assignee: Chiron-Werke GmbH & Co. KG, Tuttlingen (DE)

( * ) Notice: Subject to any disclaimer, the term of this patent is extended or adjusted under 35 U.S.C. 154(b) by 0 days.

(21) Appl. No.: 09/393,601

(22) Filed: Sep. 10, 1999

(30) Foreign Application Priority Data

Sep. 15, 1998 (DE) ............................. 198 42 147
Oct. 29, 1998 (DE) ............................. 198 49 833

(51) Int. Cl.[7] ................. B23C 9/00; B23C 1/14
(52) U.S. Cl. ................. 409/137; 409/134; 409/165; 409/172; 409/198; 82/101; 82/162; 29/27 C; 29/DIG. 50; 29/DIG. 94; 29/DIG. 100
(58) Field of Search ................. 409/134, 137, 409/163, 164, 165, 166, 168, 201, 219, 225, 227, 136, 235, 135, 172, 173, 198; 29/DIG. 61, DIG. 94, DIG. 101, DIG. 102, 27 R, 27 C, DIG. 50, DIG. 53, DIG. 100; 408/67, 234, 56, 710; 451/457, 453, 455, 451, 385, 361, 411; 125/340, 35; 414/312, 198; 222/236; 82/101, 162, 901; 483/3

(56) References Cited

U.S. PATENT DOCUMENTS

| | | | | |
|---|---|---|---|---|
| 321,698 | * | 7/1885 | Eberhardt | 409/137 |
| 3,204,499 | * | 9/1965 | Schoenrock | 29/DIG. 94 |
| 3,719,307 | * | 3/1973 | Larson | 222/236 |
| 3,942,657 | * | 3/1976 | Knutsen | 414/312 |
| 4,163,313 | * | 8/1979 | Matsuno et al. | 409/173 |
| 4,186,658 | * | 2/1980 | Brown | 100/148 |
| 4,310,270 | * | 1/1982 | Kraus | 408/234 |
| 4,523,360 | * | 6/1985 | Giovanola | 409/137 |
| 4,543,021 | * | 9/1985 | Adler | 409/134 |
| 4,545,271 | * | 10/1985 | Romi | 29/36 |
| 4,768,902 | * | 9/1988 | Rutschle et al. | 409/134 |
| 4,772,380 | * | 9/1988 | Cramer et al. | 209/2 |
| 4,863,319 | * | 9/1989 | Winkler et al. | 409/134 |
| 4,884,927 | * | 12/1989 | Menker | 409/134 |
| 5,172,464 | * | 12/1992 | Kitamura et al. | 409/168 |
| 5,263,800 | * | 11/1993 | Chen | 409/137 |
| 5,364,210 | | 11/1994 | Rütschle et al. | 409/134 |
| 5,586,848 | * | 12/1996 | Suwijn | 409/137 |
| 5,624,363 | * | 4/1997 | Kuriki | 29/DIG. 94 |
| 5,658,105 | * | 8/1997 | Takahashi | 409/134 |
| 5,919,011 | | 7/1999 | Schweizer | 409/131 |
| 5,979,039 | * | 11/1999 | Rehm | 409/137 |
| 6,056,487 | * | 5/2000 | Brehmer et al. | 409/137 |
| 6,176,656 | * | 1/2001 | Seong | 409/134 |
| 6,178,609 | * | 1/2001 | Laur | 29/33 P |

FOREIGN PATENT DOCUMENTS

| | | | | |
|---|---|---|---|---|
| 867636 | * | 2/1953 | (DE) | 409/201 |
| 40 27 895 A1 | | 3/1992 | (DE) | |
| 43 06 093 A1 | | 9/1994 | (DE) | |
| 196 23 422 A1 | | 12/1997 | (DE) | |

* cited by examiner

*Primary Examiner*—A. L. Wellington
*Assistant Examiner*—Erica D. Ergenbright
(74) *Attorney, Agent, or Firm*—Cummings & Lockwood

(57) ABSTRACT

A machine tool has a vertical-axis tool spindle that receives a tool, and a workpiece table on whose upper side is arranged a fixture for clamping in a workpiece. The tool spindle and workpiece table are displaceable relative to one another in a working region in which the workpiece is arranged. The working region extends at least partially, in a direction transverse to the spindle axis, outside the workpiece table; the fixture projects in that direction beyond the table, holds the workpiece there, and is open at the bottom so that chips that are produced can freely fall downward in the direction of the spindle axis.

12 Claims, 4 Drawing Sheets

MACHINE TOOL WITH A WORKING AREA EXTENDING OUTSIDE A WORKPIECE TABLE

BACKGROUND OF THE INVENTION

1. Field of the Invention

The present invention concerns a machine tool having a tool spindle that receives a tool and has a vertically oriented spindle axis, and having a workpiece table on whose upper side is arranged at least one fixture for clamping in a workpiece to be machined with the tool, the tool spindle and workpiece table being displaceable relative to one another in a working region in which the workpiece is arranged.

2. Related Prior Art

A machine tool of this kind is known from DE 43 06 093 A1.

Commonly known machine tools generally have a workpiece table as well as a spindle head that carries the tool spindle and is displaceable relative to the workpiece table in three mutually orthogonal directions. It is also known to implement one or more of the orthogonal displacement directions by movement of the workpiece table.

Machine tools of this kind having vertical-axis tool spindles are used for material-removing machining of-among others-bulky and in some cases very heavy objects that are clamped onto the upper side of the workpiece table by way of a "fixture." Depending on the application and field of use, various cutting, cooling, and/or flushing fluids —referred to hereinafter generally as "coolants"—are used to cool the tool being used, to improve the cutting effect, and to remove the chips that are produced during machining.

The machine tools have an encapsulated working space in which machining of the workpiece is accomplished. This encapsulated working space allows a very high coolant flow, with which the chips can be flushed away from the working region, i.e. from the workpiece being machined, the tool that is in use, and the workpiece table and other parts of the machine tool.

It is known to transport the chips via "chip chutes" into collection containers that are arranged in the machine stand of the particular machine tool. The coolant involved is aspirated or pumped off in the machine stand and reprocessed —in particular, filtered and in some cases also chemically purified —for further use.

Despite reprocessing, with these machine tools each machining operation on a workpiece is associated with a certain coolant loss, which is perceived as disadvantageous. A further disadvantage arises from the need for "reprocessing" of the used coolant, which requires design precautions and is associated with a certain energy consumption.

For reasons of cost and environmental protection, efforts are therefore being made to use as little coolant as possible in order to reduce both losses and the outlay involved in reprocessing.

At a lower coolant flow, however, there exists the risk that chips will stay adhered to various points in the working space of the machine tool, so that machine tools of this kind must often be "finish-cleaned" from inside. This is done in some cases by automatically blowing out the working space with compressed air, after a workpiece has been machined, to remove the adhering chips. It is also known to have these cleaning operations performed specifically by operating personnel.

Although it is possible in this fashion to reduce the coolant flow and thus the coolant loss entailed by the coolant flow, and to reduce costs for reprocessing, this advantage is canceled out by wage-intensive labor expenditure and additional design outlay for blow-cleaning with compressed air.

It has also been found in general that removal of the chips is nevertheless often unsatisfactory, so that in some cases finish-cleaning by hand is in fact necessary; this entails not only further wage costs, but also undesirable downtime for the machine tools designed in this fashion.

A further general advantage may be seen in the fact that the collected chips are mixed with coolant, so that laborious separation of the coolant is necessary prior to any reprocessing of the chips, e.g. in the manufacture of blanks.

In the machine tool known from the aforementioned DE 43 06 093 A1, two fixtures in which workpieces are alternatingly clamped and machined are arranged on the workpiece table. For this purpose, the working region is asymmetrically divided, by a spray shielding panel, into a loading side and a machining side; by rotating the workpiece table about its vertical axis, the loading side and machining side on its upper side can be transposed.

The spray shielding panel has a lower wall part that is rigidly attached to the workpiece table, and a pivotably mounted wall part whose underside rests loosely on the upper side of the rigid wall part and automatically rises and then descends again as the workpiece table is lifted and rotated.

With this machine tool as well, the aforementioned disadvantages occur in connection with the chips that are produced, which collect on the workpiece table and cannot be completely removed therefrom even by a very large coolant flow; finish-cleaning by hand is therefore necessary, this being performed whenever a machined workpiece is replaced, on the loading side, with a workpiece that has yet to be machined.

SUMMARY OF THE INVENTION

In view of the above, it is an object of the present invention to improve the machine tool mentioned at the outset in such a way that the aforementioned disadvantages are eliminated. In particular, the problem of removing the chips from the working region is to be solved with a simple design.

According to the present invention, this object is achieved in the case of the machine tool mentioned at the outset on the one hand by the fact that the working region extends at least partially, in a direction transverse to the spindle axis, outside the workpiece table, and the fixture projects in that direction beyond the table and holds the workpiece there, and preferably is open at the bottom so that chips that are produced can freely fall downward in the direction of the spindle axis.

The object underlying the invention is completely achieved in this fashion.

Specifically, the inventors of the present Application have recognized that, surprisingly, the disadvantages of the prior art can be eliminated not by way of different coolants or further devices for cleaning or blowing off the working region, but efficiently by way of measures of simple design. Because the fixture now projects out beyond the workpiece table and is open at the bottom, and the workpiece is machined, so to speak, next to (generally behind) the workpiece table, essentially no chips now get onto the workpiece table itself or onto the fixture; instead they fall downward through the fixture into the machine stand. This feature can be used in particularly advantageous fashion in conjunction with a "minimum-volume" lubrication system such as is known, for example, from DE 42 00 808 A1 or from DE 195 38 762 C2. In a minimum-volume lubrication system, coolant is used in very small quantities, so as to ensure only cooling of the tool and sufficiently good cutting quality. The chips occurring in this context are almost unwetted with coolant, i.e. cannot adhere either to the workpiece or to the tool or other parts of the machine tool.

In addition to good removal of chips, the further advantage that results with the new machine tool in conjunction with a minimum-volume lubrication system is therefore that reprocessing of the chips is greatly simplified, and costs for coolant recovery are essentially eliminated.

The overall result is that with the new machine tool, it is also no longer necessary to equip the working space with particular cleaning devices or to finish-clean it frequently by hand, although of course further cleaning device may be provided for reasons not of interest here.

Existing machine tools can also be refitted in accordance with the present invention: all that is necessary for that purpose is to reduce the size of the table plate of the workpiece table to the point that the working region, located above the workpiece table in the case of existing machine tools, at least partially projects laterally beyond the workpiece table that has now been reduced in size. Instead of the usual fixture, it is also necessary to mount on the upper side of the reduced-size workpiece table a fixture that projects beyond the workpiece table in the direction of the headstock and carries the workpiece there, and is open at the bottom.

This kind of "asymmetrical" clamping of a workpiece encounters considerable prejudice in conventional machine tool design, since the danger exists that machining accuracy will suffer due to tilting of the fixture. The inventors of the present Application have found, however, that particularly in the case of vertical-axis machine tools, in which the table surface of the workpiece table therefore extends horizontally, it is possible to use fixtures that are rigid within the context of the necessary accuracy and can be nondisplaceably attached to the workpiece table. In other words, contrary to expectations, it is indeed possible for the workpiece that is being machined to be held laterally outside the contour of the workpiece table without thereby impairing machining accuracy.

Be it also mentioned that in the case of existing machine tools, instead of a reduction in the size of the table surface it is also possible to provide openings or cutouts in the table surface In an embodiment, it is preferred if the fixture supports the workpiece in actively rotatable fashion about an axis transverse to the spindle axis, preferably supports it rotatably through at least approximately 180°.

The advantage here is that after a machining operation on the upper side of the workpiece, the fixture can rotate the latter through 180° so that chips can fall downward out of the workpiece and out of holes, etc. introduced thereinto. Because of the greatly reduced coolant flow, these chips do not adhere to the workpiece but rather fall downward into the machine stand, as the inventors named in the present Application have found.

In other words, with a machine tool configured in accordance with the present invention little or no coolant flow is required in order to cool the tool and, optionally, ensure a corresponding level of machining quality; the chips are removed from the working region, so to speak, by gravity, and no additional coolant is necessary for the purpose.

It is further preferred if the machine tool has, below the fixture, at least one deflector panel for falling chips; it is further preferable if two deflector panels are provided, forming a roof that is rounded at the top and tapers to a point.

The advantage here is that the falling chips are conveyed in defined fashion in the machine stand. The use of large-area deflector panels is possible because the chips are not so extensively wetted with coolant that they can undesirably adhere to the deflector panels.

It is further preferred if the or each deflector panel ends at the bottom in a channel; also preferably, a mechanical chip conveyor that preferably is a screw conveyor is arranged in the channel.

The advantage here is that the chips can be transported away in mechanically simple fashion, for example by taking them into a chip sump that is replaced from time to time by operating personnel. Because the chips are now, so to speak, "dry," they can be transported away in a channel by way of a mechanical chip conveyor, and the use of fluid, which hitherto was necessary, can be eliminated. This feature thus also contributes to a reduction in coolant utilization.

On the other hand, the object underlying the invention is achieved, in the case of the machine tool mentioned at the outset, by the fact that there is arranged above the workpiece table a center partition wall that divides the working region, preferably asymmetrically, into a loading side and a machining side, and that has a roof-shaped lower part, covering at least most of the upper side of the workpiece table, below which supply lines for the fixture and other installations are to be arranged upon and/or on the workpiece table.

The object underlying the invention is completely achieved in this fashion as well, since the inventors of the present Application have recognized that greatly improved chip removal occurs, especially in the case of a fixture projecting in the Y direction beyond the workpiece table, if a roof-like lower part of the center partition wall that covers the workpiece table is used.

It is thereby possible to arrange the supply lines or other installations—among which is, for example, a laser measurement apparatus —beneath this "roof," so that chips that are removable only manually cannot become caught on or between them. Especially when the fixture projecting beyond the workpiece table is used to clamp the workpiece that is to be machined, it is possible in this fashion to cover the entire workpiece table, so that no further attention need be paid to a particularly "chip-resistant" arrangement of the connecting lines, etc. The overall result thereof, despite what appears at first glance to be greater design outlay for the center partition wall, is less design outlay for the machine tool in general. One great advantage lies in the fact that complex measures for removing collected chips can be dispensed with; the reason is that the present invention ensures that chips can no longer collect at all on the upper side of the workpiece table, since they are diverted by the roof on the workpiece table in such a way that they fall into chip sumps or onto further chip guide panels.

In general, it is preferred in this context if the center partition panel comprises a wall part, mounted pivotably about a pivot axis running transverse to the spindle axis, that rests with its preferably angled lower section on a preferably rounded ridge of the lower part.

This feature is already known per se from DE 43 06 093 A1; it allows the arrangement of two fixtures on one workpiece table, which merely needs to be rotated 180° about its vertical axis in order to transpose the loading side and machining side. The center partition wall now makes possible machining, on the larger machining side, of the workpiece that is clamped in there, while at the same time an operator can clamp in a new workpiece on the loading side with no possibility for flying chips and splashes of coolant to reach the loading side. Provision is further made, because of the angled configuration of the lower section of the pivotably mounted wall part, for chips or coolant occurring there to be carried off.

It is further preferred if the roof-shaped lower part extends beyond the workpiece table on both sides of the fixture, the roof-like lower part preferably having a skirt that extends into the fixture.

This feature ensures particularly effective coverage and chip removal. The roof-shaped lower part acts on both sides of the fixture as a chip guide panel, so that chips can no longer collect there, while within the fixture, i.e. between two cheekpieces of the fixture, a skirt projects inward and prevents chips from being deposited there.

Further advantages are evident from the description and from the appended drawings.

BRIEF DESCRIPTION OF THE DRAWINGS

It is understood that the features mentioned above and those yet to be explained below can be used not only in the respective combinations indicated, but also in other combinations or in isolation, without leaving the context of the present invention.

An embodiment of the invention is shown in the drawings and will be explained in more detail in the description below. In the drawings.

DETAILED DESCRIPTION OF A PREFERRED EMBODIMENT

Figure 1:
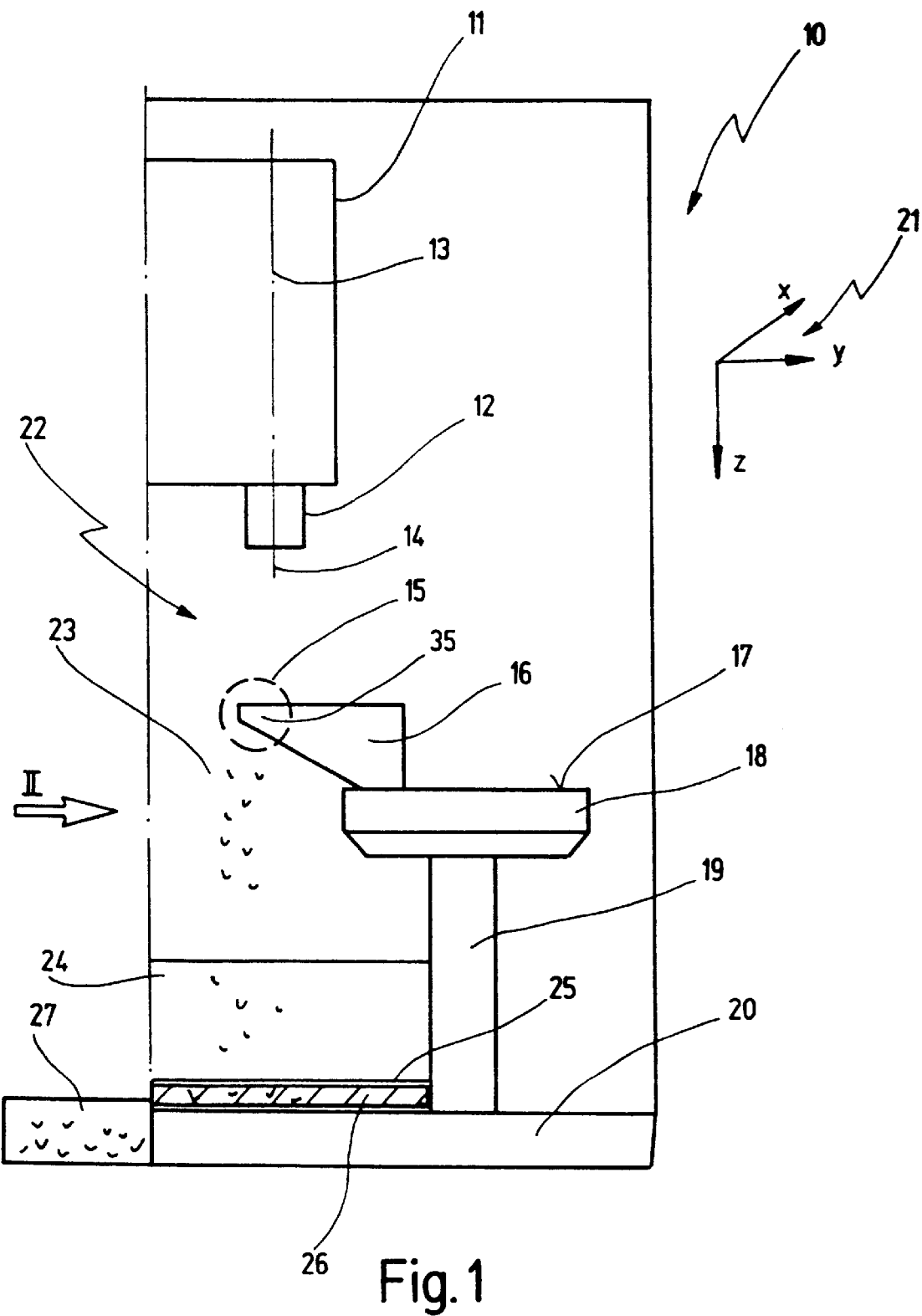
FIG. 1 shows a schematic side view of the new machine tool.

In FIG. 1, 10 designates a machine tool that is shown in a partial schematic representation. Machine tool 10 comprises a spindle head 11 in which a tool spindle 12 is mounted rotatably about a vertical spindle axis 13. A tool 14 that serves to machine a workpiece (indicated at 15) is received in tool spindle 12.

Workpiece 15 is clamped in a fixture 16, shown in side view, that is arranged on an upper side 17 of a workpiece table 18. Workpiece table 18 sits on a stand 19 that in turn is anchored in machine stand 20 of machine tool 10.

As indicated by a coordinate system 21, the spindle head is displaceable relative to workpiece table 18, in a working region indicated at 22, in three mutually orthogonal directions. Fixture 16 projects out into this working region laterally in the Y direction beyond workpiece table 18, and holds workpiece 15 there in readiness for machining with tool 14.

The chips thereby produced are indicated at 23. Since fixture 16 projects out beyond workpiece table 18 and is open at the bottom, chips 23 fall downward in the direction of spindle axis 13 and in the process encounter a deflector panel 24 that opens at the bottom into a channel 25. Arranged in channel 25 is a schematically indicated mechanical chip conveyor 26 that transports the chips into a chip sump 27.

Figure 2:
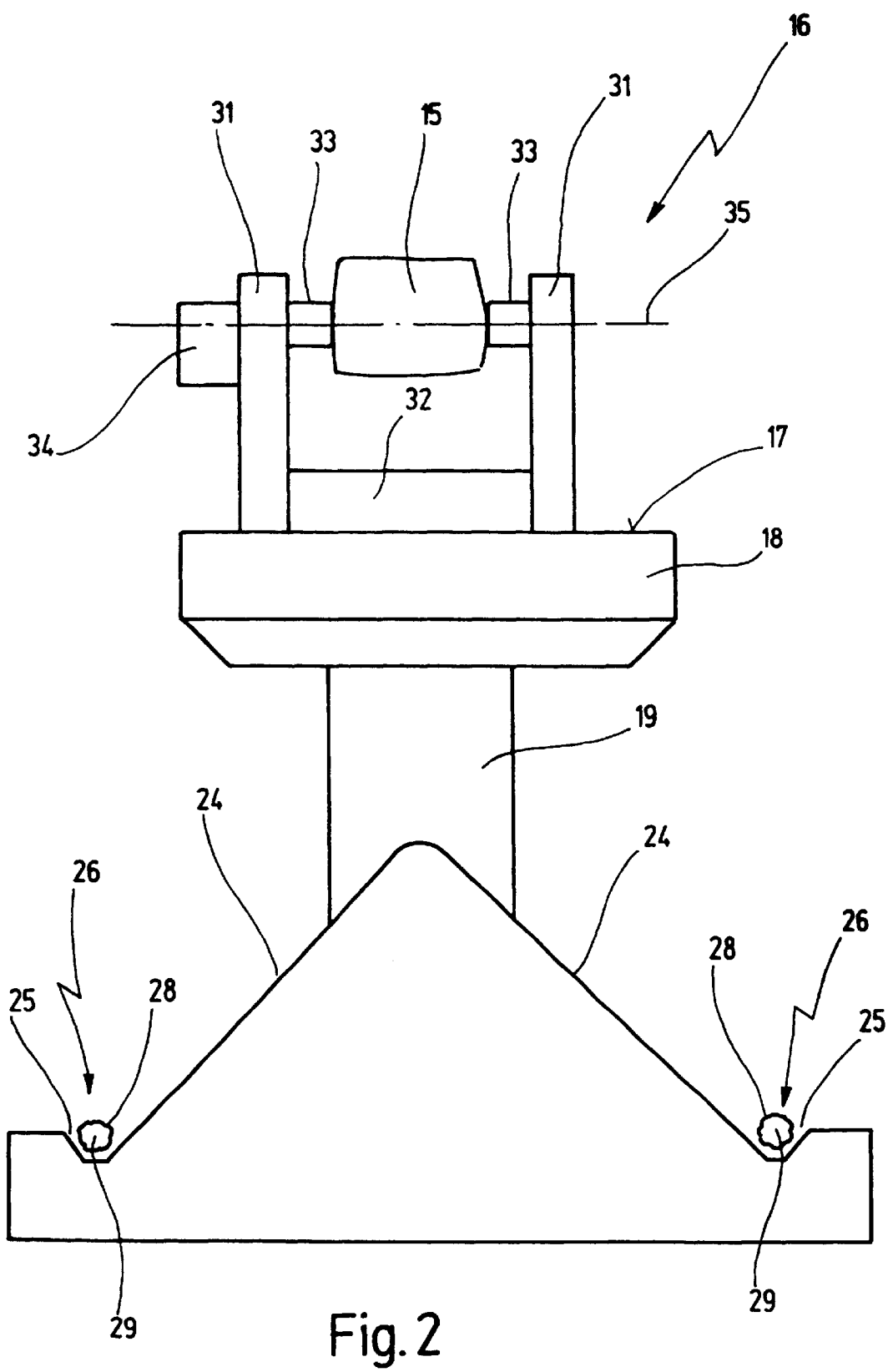
FIG. 2 shows a partial view of the machine tool of FIG. 1, along arrow II.

In FIG. 2, machine tool 10 is shown in a view in the direction of arrow II from FIG. 1. It is apparent that two deflector panels 24 are provided, forming a roof which is rounded at the top and tapers to a point and on which the chips slide down to the left and right into channels 25. Arranged in these channels 25 are chip conveyors 26, which in the embodiment shown are screw conveyors 28, i.e. in the simplest case comprise a rotatably driven screw shaft 29 that transports chips 23 in the direction of its flights as it rotates.

Fixture 16 that is evident in FIG. 2 comprises two cheekpieces, arranged parallel to one another, that are mounted on a base 32 that is bolted in suitable fashion onto upper side 17 of workpiece table 18. Clamping devices 33 facing toward one another, which for example can be constituted by clamping chucks, are provided on cheekpieces 31. Clamping devices 33 receive between them workpiece 15, which they can rotate about an axis 35 by way of a motor 34 that is also shown in FIG. 1. Axis 35 runs transverse to spindle axis 13. Between cheekpieces 31, the fixture is freely accessible from below, i.e. is open at the bottom.

As a workpiece 15 is machined in the new machine tool 10, only a low coolant flow is necessary in order to cool the respective tool 14 and optionally to ensure good cutting quality. The resulting chips 23 are predominantly "dry," so that they do not adhere to fixture 16, workpiece 15, or deflector panels 24, but rather fall in response to gravity into channels 25, where they are transported by way of screw conveyors 28 into chip sump 27.

Figure 3:
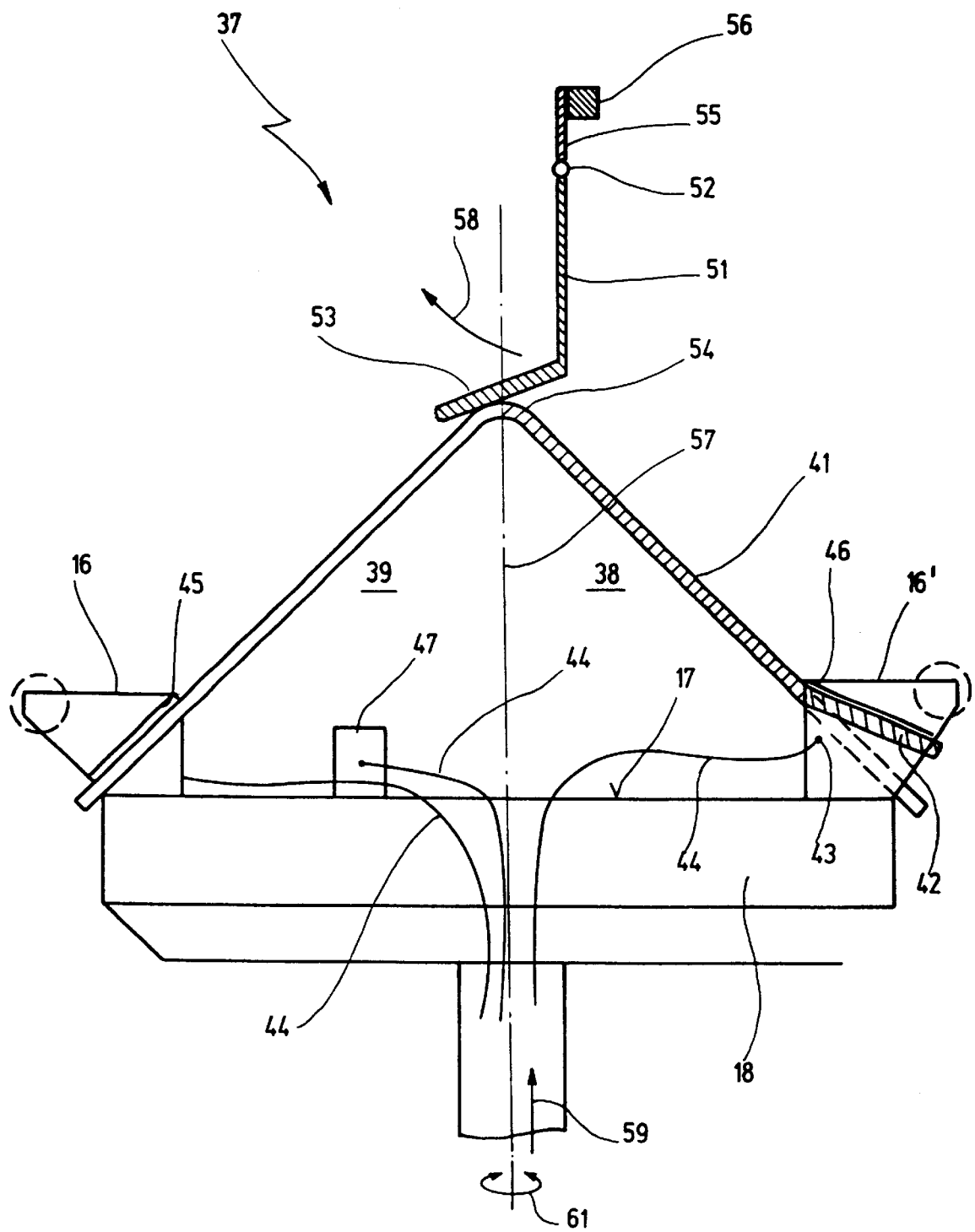
FIG. 3 shows a side view of a workpiece table for a machine tool of FIG. 1, with two fixtures and a center partition wall.

FIG. 3 shows, in a schematic side view, a workpiece table 18 whose upper side 17 is divided asymmetrically, by a center partition wall 37, into a loading side 38 and a larger machining side 39. A respective fixture 16, 16' is arranged both on loading side 38 and on machining side 39. While the workpiece clamped into fixture 16 is being machined, a new workpiece can be clamped into fixture 16', an operator being protected from flying chips and coolant splashes by center partition wall 37.

Center partition wall 37 comprises a roof-shaped lower part 41 that almost completely covers upper side 17 of workpiece table 18. Roof-shaped lower part 41 is shown in cross section in the region of fixture 16', only the rear cheekpiece 31' of fixture 16' being shown.

Figure 4:
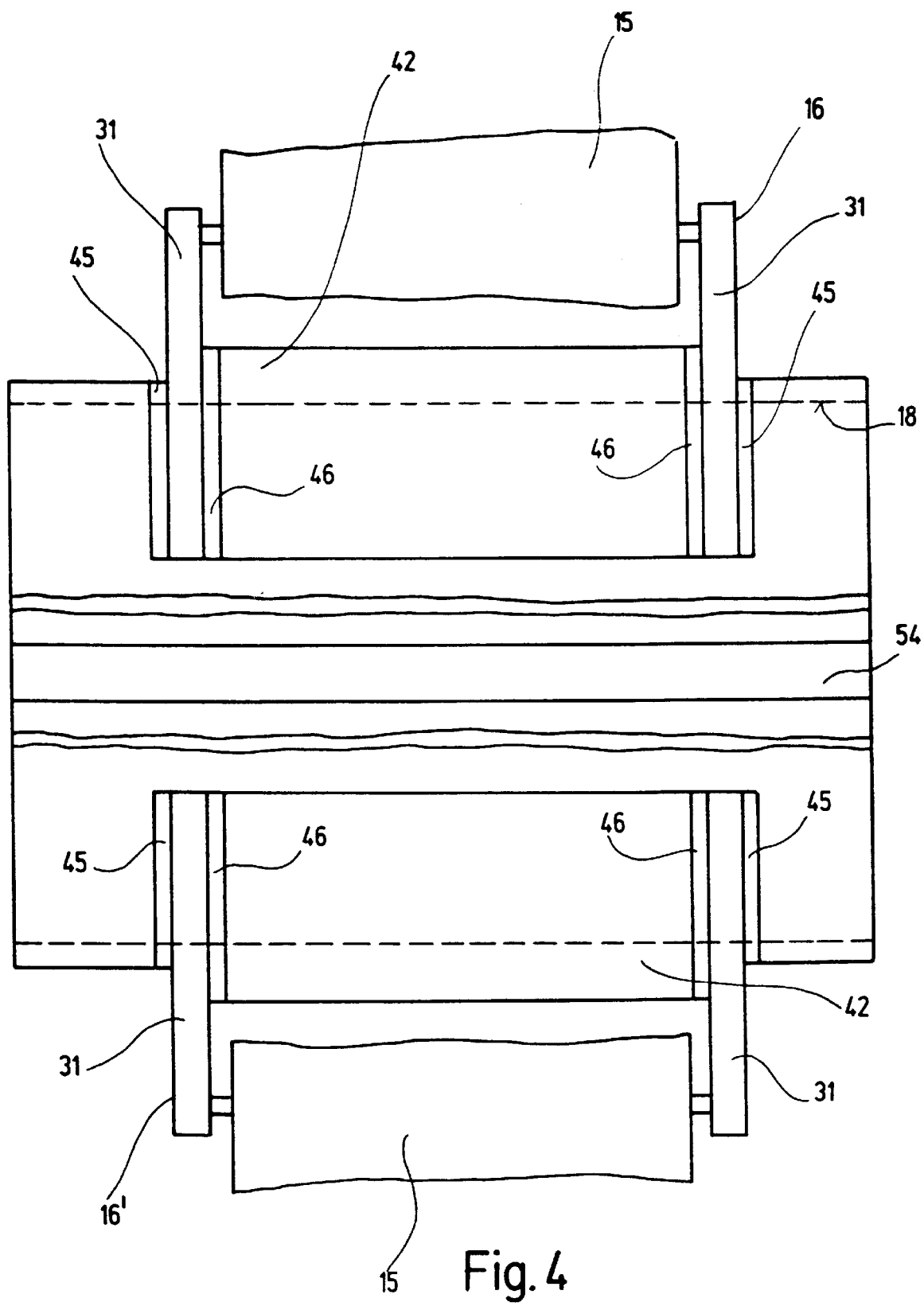
FIG. 4 shows a plan view of the workpiece table of FIG. 3.

Roof-shaped lower part 41 extends out beyond workpiece table 18 on both sides of fixtures 16, 16', as is evident in particular from the plan view in FIG. 4. Extending between the two cheekpieces 31 of fixtures 16, 16' is a skirt 42, swung up by comparison with the rest of roof-shaped lower part 41, that on the one hand protects upper side 17 of workpiece table 18 from chip deposition in this region, but on the other hand exposes connection points 43 of fixtures 16, 16' through which they are connected to connecting lines 44 that serve, in the usual way, to deliver pneumatic and/or electrical energy, acquire measurement signals, etc.

In the region of cheekpieces 31, both roof-shaped lower part 41 and skirt 42 are equipped with bent-up edge regions 45 and 46 that rest externally and internally, respectively, closely against cheekpieces 31 and prevent chips from falling between cheekpieces 31 or between roof-shaped lower part 41 and skirt 42.

It is also evident from the schematic side view of FIG. 3 that a further installation 47, which for example can be a laser measurement system, is arranged on upper side 17 of workpiece table 18. Both connecting lines 44 and further installation 47 are protected from chips and coolant by roof-shaped lower part 41: the chips are guided by roof-shaped lower part 41 and skirt 42, in the manner of chip guide panels, over the edge of workpiece table 18 so that they fall downward and there are transported via deflector panels 24 into a corresponding chip sump 27.

Above roof-shaped lower part 41, center partition wall 37 is configured in the manner known from DE 43 06 903 A1 mentioned at the outset, the content of which is hereby incorporated into the disclosure of the present Application by reference.

Specifically, the center partition wall comprises a wall part 51 that is mounted pivotably on a pivot axis 52 that runs parallel to upper side 17 and thus transverse to spindle axis 13. Wall part: 51 rests with its bent lower section 53 on a rounded ridge 54 of roof-shaped lower part 41. At pivot axis 52, wall part 51 is attached to a rigid upper wall part 55 that is mounted in known fashion to a crossbeam 56.

When workpiece table 18 is to be pivoted about its vertical axis (indicated at 57) in order to transpose loading side 38 and machining side 39, it is first raised in the direction of an arrow 58 in order to bring corresponding serration sets out of engagement. As workpiece table 18 is raised in this fashion, wall part 51 pivots about pivot axis 52 in the direction of an arrow 59 and then slides with its angled lower section 53 along ridge 54, if workpiece table 18 is being pivoted in the direction of an arrow 61. This operation is described in DE 43 06 093 A1 that has already been mentioned, so that reference may be made to this document for further information.

In conclusion, be it also noted that because lower section 43 is angled, chips that strike center partition wall 37 there are deflected and are guided via roof-shaped lower part 41 onto deflector panels 24.

What is claimed is:

1. A machine tool, having
   a tool spindle receiving a tool for machining a workpiece and having a spindle axis with a vertically oriented direction,
   a workpiece table having an upper side, the tool spindle and workpiece table being displaceable relative to one another in a working area, the workpiece being arranged in said working area, and
   a first and a second fixture arranged at said upper side for clamping in said workpiece,
   wherein there is arranged above the workpiece table a center partition wall dividing the working area into a loading side comprising said first fixture and a machining side comprising said second fixture,
   said center partition wall having a lower part showing a triangular cross-section and covering at least most of the loading side and machining side of the workpiece table, supply lines for delivering energy to the fixtures and to further installations being provided and being covered by said lower part.

2. The machine tool as in claim 1, having, below the fixtures, at least one deflector panel for falling chips.

3. The machine tool as in claim 2, wherein two deflector panels are provided, forming a roof having a top, wherein the roof is rounded at the top and tapers to a point.

4. The machine tool as in claim 2, wherein the at least one deflector panel has a bottom, wherein the at least one deflector panel ends at the bottom in a channel.

5. The machine tool as in claim 4, wherein a mechanical chip conveyor is arranged in the channel.

6. The machine tool as in claim 5, wherein the chip conveyor is a screw conveyor.

7. The machine tool as in claim 1, wherein each fixture has two sides and the lower part extends beyond the workpiece table on said two sides of each of the fixtures.

8. The machine tool as in claim 1, wherein the lower part has at least one skirt extending into one of the fixtures.

9. The machine tool as in claims 1, wherein the center partition wall comprises a wall part having an angled lower section, said wall part being mounted pivotably about a pivot axis, said pivot axis running transverse to the spindle axis, said lower section of the wall part resting on a rounded ridge of said lower part.

10. The machine tool as in claim 1, wherein each fixture comprises means defining an axis transverse to the spindle axis for supporting the workpiece for rotation about said transverse axis.

11. The machine tool as in claim 10, wherein each of the supporting means supports the workpiece for rotation through at least approximately 180°.

12. A machine tool comprising:
    a tool spindle receiving a tool for machining a workpiece and having a spindle axis with a vertically oriented direction;
    a workpiece table having an upper side, the tool spindle and workpiece table being displaceable relative to one another in a working area, the workpiece being arranged in said working area; and
    a fixture arranged at said upper side for clamping in said workpiece, wherein there is arranged above the workpiece table a center partition wall dividing the working area into a loading side and a machining side,
    said center partition wall having a lower partition showing a triangular cross-section and covering at least most of the upper side of the workpiece table, supply lines for delivering energy to the fixture and to further installations being provided and being covered by said lower part,
    said fixture projecting in a direction transverse to the spindle axis beyond the workpiece table and holding the workpiece beyond the workpiece table, whereby said working area extends at least partially outside the workpiece table in said direction transverse to the spindle axis,
    said fixture being open at the bottom so that chips that are produced during machining of said workpiece fall freely downward in the direction of the spindle axis.

* * * * *